United States Patent
Lee

(10) Patent No.: US 9,872,236 B2
(45) Date of Patent: Jan. 16, 2018

(54) COMMUNICATIONS APPARATUS AND METHOD FOR CARRIER SEARCH

(71) Applicant: MediaTek Inc., Hsin-Chu (TW)

(72) Inventor: Chi-Chen Lee, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/030,023

(22) PCT Filed: Nov. 28, 2014

(86) PCT No.: PCT/CN2014/092499
§ 371 (c)(1),
(2) Date: Apr. 15, 2016

(87) PCT Pub. No.: WO2015/078412
PCT Pub. Date: Jun. 4, 2015

(65) Prior Publication Data
US 2016/0262092 A1 Sep. 8, 2016

Related U.S. Application Data

(60) Provisional application No. 61/910,137, filed on Nov. 29, 2013.

(51) Int. Cl.
*H04W 4/00* (2009.01)
*H04W 48/16* (2009.01)
(Continued)

(52) U.S. Cl.
CPC .......... *H04W 48/16* (2013.01); *H04W 36/04* (2013.01); *H04M 1/72519* (2013.01); *H04W 80/04* (2013.01)

(58) Field of Classification Search
CPC ..... H04W 48/16; H04W 36/04; H04W 80/04; H04M 1/72519
(Continued)

(56) References Cited

U.S. PATENT DOCUMENTS 7,599,693 B2 * 10/2009 Kuriyama ............. H04W 48/16
455/434
8,014,342 B2    9/2011 Ekstedt et al.
(Continued)

FOREIGN PATENT DOCUMENTS

CN    101548516    9/2009
CN    101622836    1/2010
(Continued)

OTHER PUBLICATIONS

International Search Report dated Mar. 3, 2015, issued in application No. PCT/CN2014/092499.

*Primary Examiner* — Danh Le
(74) *Attorney, Agent, or Firm* — McClure, Qualey & Rodack, LLP

(57) ABSTRACT

A communications device and method for a carrier search are provided. The communication apparatus includes an RF signal processing device, a processor, and a memory device. The RF signal processing device receives a plurality of main system information and extra system information broadcasted by service networks. The processor is configured to check whether the extra system information corresponding to a second cell has been broadcasted by a detected network when a first center frequency of a first cell corresponding to a target radio access technology has been searched, and search a second center frequency of the second cell according to the extra system information corresponding to the second cell. All or a port of carriers are skipped according to the extra system information corresponding to the second cell. The memory device stores the main and extra system information received from detected service networks.

22 Claims, 13 Drawing Sheets

(51) Int. Cl.
*H04W 36/04* (2009.01)
*H04M 1/725* (2006.01)
*H04W 80/04* (2009.01)

(58) Field of Classification Search
USPC .................. 455/434, 550.1, 444; 370/328
See application file for complete search history.

(56) References Cited

U.S. PATENT DOCUMENTS

| | | | |
|---|---|---|---|
| 8,743,785 B2* | 6/2014 | Qu | H04W 52/244 370/328 |
| 2009/0274086 A1* | 11/2009 | Petrovic | H04J 11/0093 370/312 |
| 2010/0081433 A1 | 4/2010 | Lee | |
| 2010/0197301 A1 | 8/2010 | Islam et al. | |
| 2012/0147850 A1* | 6/2012 | Zheng | H04W 48/16 370/331 |
| 2013/0121218 A1 | 5/2013 | Lu | |
| 2013/0203419 A1* | 8/2013 | Siomina | H04W 36/18 455/437 |
| 2013/0295928 A1* | 11/2013 | Suzuki | H04W 48/16 455/434 |
| 2013/0308481 A1* | 11/2013 | Kazmi | H04W 24/02 370/252 |
| 2014/0057624 A1* | 2/2014 | Murgan | H04B 1/7087 455/422.1 |
| 2014/0133478 A1 | 5/2014 | Malladi et al. | |
| 2015/0016339 A1* | 1/2015 | You | H04J 11/0073 370/328 |

FOREIGN PATENT DOCUMENTS

| | | |
|---|---|---|
| CN | 101835231 | 9/2010 |
| CN | 103270793 | 8/2013 |

\* cited by examiner

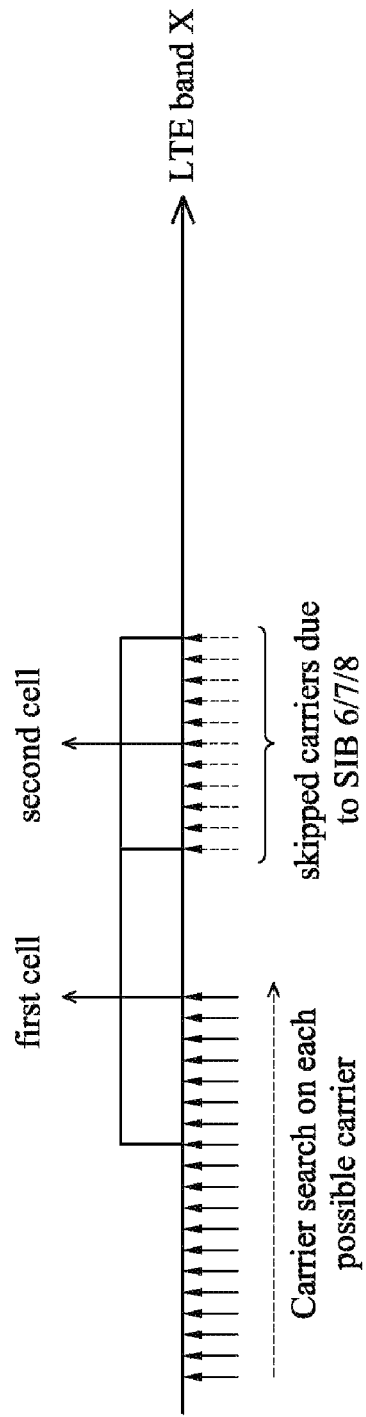

COMMUNICATIONS APPARATUS AND METHOD FOR CARRIER SEARCH

CROSS REFERENCE TO RELATED APPLICATIONS

This application is a National Phase of PCT Application No. PCT/CN2014/092499, filed on Nov. 28, 2014, which claims priority of U.S. Provisional Patent Application No. 61/910,137, filed on Nov. 29, 2013, the entirety of which is incorporated by reference herein.

FIELD OF INVENTION

The invention generally relates to a communications apparatus and method for carrier search, and more particularly, to the method of performing carrier search according to extra system information.

BACKGROUND OF THE INVENTION

Wireless communications systems are widely deployed to provide various telecommunications services such as telephony, video, data, messaging, and broadcast. Typical wireless communications systems may employ multiple-access technologies capable of supporting communications with multiple users by sharing available system resources (e.g., bandwidth, transmitting power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

When user equipment (UE) searches for an LTE cell, because the user equipment cannot know the center frequency of the LTE cell, the user equipment needs to scan the whole band. Therefore, the user equipment may spend a long time searching for an LTE cell. For example, as shown in FIG. 1A, when the user equipment perform carrier search in the LTE band X, because the user equipment doesn't have the information for the LTE cells. Therefore, even if the user equipment finds LTE cell 1, the user equipment still needs to detect other carriers in a LTE band X for searching for other LTE cells (e.g. LTE cell 2).

In addition, because 4G Radio Access Technology (i.e. Long Term Evolution (LTE)) needs to support more and more bands, many bands which support LTE may overlap with the bands which support 2G and/or 3G Radio Access Technology. In addition, due to spectrum re-framing, some 2G/3G bands will be re-used for deploying 4G, thus, it is possible 2G and 4G or 3G and 4G will be deployed on the same band. For example, as shown in table 1, the band 1805-1880 MHz may be deployed by 2G, 3G and/or 4G, the band 1905-1990 MHz may be deployed by 2G, 3G and/or 4G, and the band 2110-2170 MHz may be deployed by 3G and/or 4G.

TABLE 1

| DL freq. range (MHz) | 2G | 3G | 4G |
|---|---|---|---|
| 1805-1880 | GSM 1800 | WCDMA band3 | LTE band3 |
| 1930-1990 | GSM 1900 | WCDMA band2 | LTE band2 |
| 2110-2170 | x | WCDMA band1 | LTE band1 |

Therefore, when the user equipment performs a carrier search in an LTE band, there may be a 2G/3G cell on the LTE band. The user equipment may spend long time detecting all cells in the LTE band, but can't search for a 4G cell in the LTE band. For example, as shown in FIG. 1B, when the user equipment performs carrier search for 4G cell in the LTE band X, because there are only 2G and 3G cell in the LTE band X, the user equipment can't search for a 4G cell in the LTE band X.

SUMMARY OF THE INVENTION

A communications apparatus and carrier search method are provided to overcome the above-mentioned problems.

An embodiment of the invention provides a communication apparatus. The communication apparatus comprises a RF signal processing device, a processor, and a memory device. The RF signal processing device is configured to receive a plurality of main system information and extra system information broadcasted by service networks. The processor is configured to check whether the extra system information corresponding to a second cell has been broadcasted by a detected network when a first center frequency of a first cell corresponding to a target radio access technology has been searched, and search a second center frequency of the second cell according to the extra system information corresponding to the second cell. The memory device is configured to store the main and extra system information received from detected service networks.

An embodiment of the invention provides a carrier search method for a communication apparatus. The carrier search method comprises the steps of determining a target radio access technology and initiating a carrier search; searching for a first center frequency of a first cell corresponding to a target radio access technology; checking whether extra system information corresponding to a second cell has been broadcasted by the detected network when the first center frequency of the first cell has been found; receiving the extra system information corresponding to the second cell if the extra system information corresponding to the second cell is broadcasted by the detected network; searching for a second center frequency of the second cell according to the extra system information corresponding to the second cell, if the extra system information corresponding to the second cell is broadcasted by the detected network; and storing the extra system information corresponding to the second cell to a memory device.

Other aspects and features of the invention will become apparent to those with ordinary skill in the art upon review of the following descriptions of specific embodiments of communication transmission methods and systems.

BRIEF DESCRIPTION OF THE DRAWINGS

The invention will become more fully understood by referring to the following detailed description with reference to the accompanying drawings, wherein:

FIG. 4A is schematic diagram of carrier search of the UE 110 for an intra-band case according to another embodiment of the invention;

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
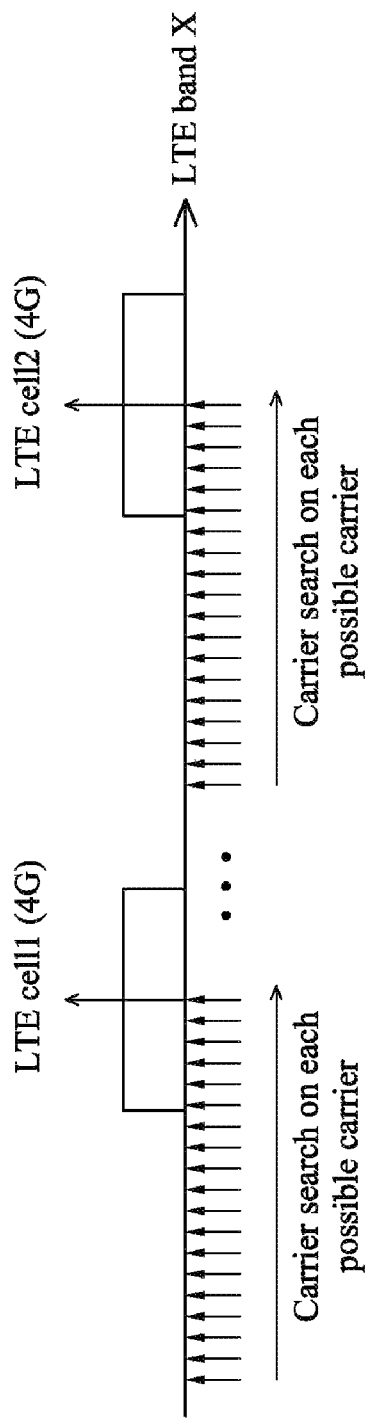
FIG. 1A is a schematic diagram of carrier search according to the prior art.
Figure 1B:
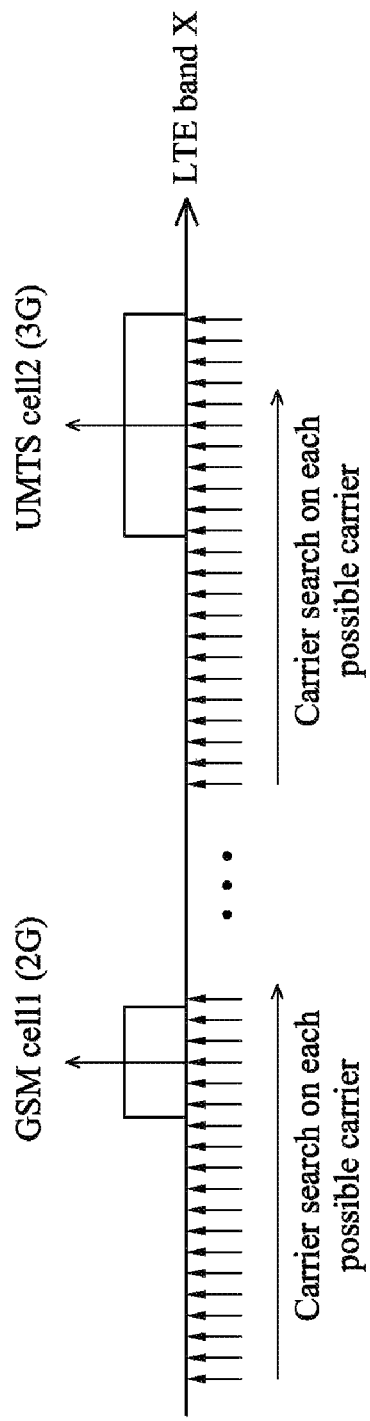
FIG. 1B is another schematic diagram of carrier search according to the prior art.
Figure 2:
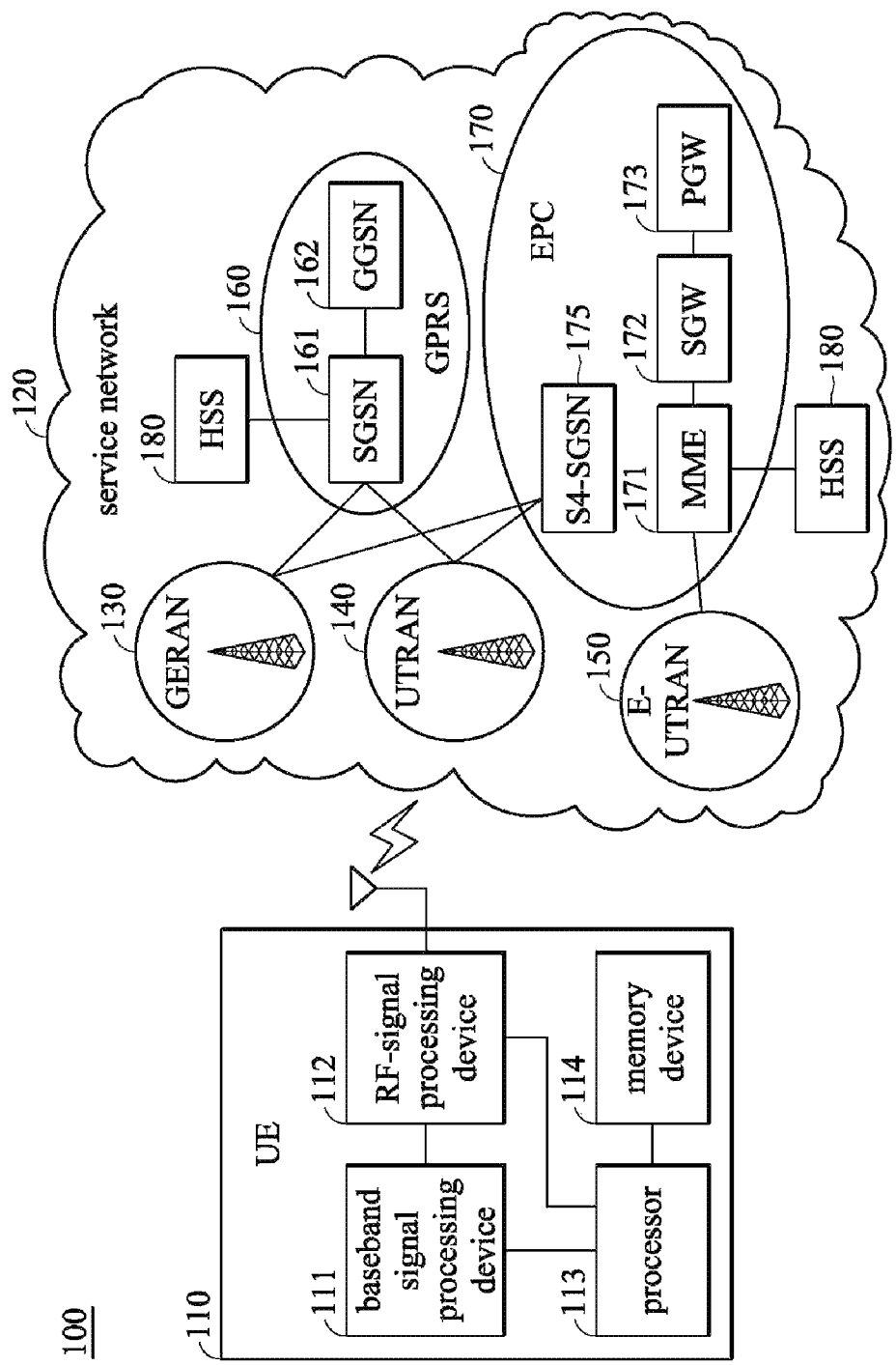
FIG. 2 is a block diagram of a communications system 100 according to an embodiment of the invention.

FIG. 2 is a block diagram of a communications system 100 according to an embodiment of the invention. The communications system 100 comprises User Equipment (UE)/communications apparatus 110, and a service network 120. The UE 110 may be a communications device, such as a cellular phone, a smartphone modem processor, a data card, a laptop stick, a mobile hotspot, a USB modem, a tablet, or another communications device.

The UE 110 may comprise at least a baseband signal processing device 111, a radio frequency (RF) signal processing device 112, a processor 113, a memory device 114, and an antenna module comprising at least one antenna. Note that, in order to clarify the concept of the invention, FIG. 2 presents a simplified block diagram in which only the elements relevant to the invention are shown. However, the invention should not be limited to what is shown in FIG. 2.

The RF signal processing device 112 may receive RF signals via the antenna and process the received RF signals to convert the received RF signals to baseband signals to be processed by the baseband signal processing device 111, or receive baseband signals from the baseband signal processing device 111 and convert the received baseband signals to RF signals to be transmitted to a peer communications apparatus. The RF signal processing device 112 may comprise a plurality of hardware elements to perform radio frequency conversion. For example, the RF signal processing device 112 may comprise a power amplifier, a mixer, or etc.

The baseband signal processing device 111 may further process the baseband signals to obtain information or data transmitted by the peer communications apparatus. The baseband signal processing device 111 may also comprise a plurality of hardware elements to perform baseband signal processing. The baseband signal processing may comprise analog-to-digital conversion (ADC)/digital-to-analog conversion (DAC), gain adjustment, modulation/demodulation, encoding/decoding, and so on.

The processor 113 may control the operations of the baseband signal processing device 111 and the RF signal processing device 112. According to an embodiment of the invention, the processor 113 may also be arranged to execute the program codes of the software module(s) of the corresponding baseband signal processing device 111 and/or the RF signal processing device 112. The program codes accompanied by specific data in a data structure may also be referred to as a processor logic unit or a stack instance when being executed. Therefore, the processor 113 may be regarded as being comprised of a plurality of processor logic units, each for executing one or more specific functions or tasks of the corresponding software module(s). The memory device 114 may store the software and firmware program codes, system data, user data, etc. of the UE 110. The memory device 114 may be a volatile memory, e.g. a Random Access Memory (RAM), or a non-volatile memory, e.g. a flash memory, Read-Only Memory (ROM), or hard disk, or any combination thereof. In an embodiment of the invention, the memory device 114 stores the system information which the UE 110 has previously collected.

According to an embodiment of the invention, the RF signal processing device 112 and the baseband signal processing device 111 may be collectively regarded as a radio module capable of communicating with a wireless network to provide wireless communications services in compliance with a predetermined Radio Access Technology (RAT). Note that, in some embodiments of the invention, the UE 110 may further be extended to comprise more than one antenna and/or more than one radio module, and the invention should not be limited to what is shown in FIG. 2.

In addition, in some embodiments of the invention, the processor 113 may be configured inside of the baseband signal processing device 111, or the UE 110 may comprise another processor configured inside of the baseband signal processing device 111. Thus the invention should not be limited to the architecture shown in FIG. 2.

The service network 120 may comprise a GSM EDGE Radio Access Network (GERAN) 130, a Universal Terrestrial Radio Access Network (UTRAN) 140, an Evolved UTRAN (E-UTRAN) 150 (e.g. LTE network), a General Packet Radio Service (GPRS) subsystem 160 and an Evolved Packet Core (EPC) subsystem 170. The GERAN 130, UTRAN 140 and E-UTRAN 150 may be in communications with the GPRS subsystem 160 or the EPC subsystem 170, wherein the GERAN 130, UTRAN 140 and E-UTRAN 150 allow connectivity between the UE 110 and the GPRS subsystem 160 or the EPC subsystem 170 by providing the functionality of wireless transmission and reception to and from the UE 110 for the GPRS subsystem 160 or the EPC subsystem 170, and the GPRS subsystem 160 or the EPC subsystem 170 signals the required operation to the GERAN 130, UTRAN 140 and E-UTRAN 150 for providing wireless services to the UE 110. The GERAN 130, UTRAN 140 and E-UTRAN 150 may contain one or more base stations (also called NodeBs or eNodeBs) and Radio Network Controllers (RNCs). Specifically, the GPRS subsystem 160 includes a Serving GPRS (General Packet Radio Services) Support Node (SGSN) 161 and a Gateway GPRS Support Node (GGSN) 162, wherein the SGSN 161 is the key control node for packet routing and transfer, mobility management (e.g., attach/detach and location management), session management, logical link management, and authentication and charging functions, etc., and the GGSN 162 is responsible for Packet Data Protocol (PDP) address assignments and inter-working with external networks. The EPC subsystem 170 may comprise a Mobility Management Entity (MME) 171, which may be responsible for idle mode UE tracking, paging procedures, and attachment and activation processes. The EPC subsystem 170 may also comprise a Servicing Gateway (SGW) 172, which may be responsible for the routing and forwarding of data packets. The EPC subsystem 170 may also include a Packet data network Gateway (PGW) 173, which may be responsible for providing connectivity from the UE 110 to external networks. Both the SGSN 161 and the MME 171 may be in communications with Home Subscriber Server (HSS) 180 which may provide device identification information, an International Mobile Subscriber Identity (IMSI), etc. It should be appreciated that the EPC subsystem 170 may also comprise a S4-SGSN 175, thereby allowing the GERAN 130 or UTRAN 140 to be accessed when the GPRS subsystem 160 is replaced by the EPC subsystem 170. Additionally, the service network 120 may further include other functional entities, such as a Home Location Register (HLR) (not shown) which is a central database storing user-related and subscription-related information, and the invention is not limited thereto. Additionally, the service network 120 may comprise CDMA network or CDMA 2000 network.

When the UE 110 is turned on by a user, the UE 110 may perform the carrier search to camp on a suitable cell. In an embodiment of the invention, before performing the carrier search, the UE 110 may select a target network (i.e. service network 120) automatically from service networks (Public Land Mobile Network (PLMN) services from different service providers). In another embodiment, before performing the carrier search, the UE 110 may provide a list of all service networks for the user to select a target network (i.e. service network 120).

The UE 110 may initiate the carrier search, after the target network is selected. When a first center frequency of a first cell corresponding to a target radio access technology (e.g. GERAN 130 (2G), UTRAN 140 (3G), CDMA2000 (2G/3G) or E-UTRAN 150 (4G)) has been searched, the processor 113 may check whether the extra system information corresponding to a second cell has been broadcasted by the detected network. In an embodiment of the invention, the detected network is regarded as a target network which is selected from service networks by the user equipment 110. In another embodiment of the invention, the detected network is regarded as one of all available/detected service networks which are listed by the user equipment 110.

In an embodiment of the invention the extra system information comprises the neighbor-cell-list (NCL) information of same RAT or different RAT. If the extra system information corresponding to a second cell is broadcasted by the detected network, the RF signal processing device 112 may receive the extra system information corresponding to the second cell in the first cell even the detected network is not the selected target network, and the processor 113 may search a second center frequency of the second cell according to the extra system information corresponding to the second cell.

In an embodiment of the invention, the RF signal processing device 112 may receive a plurality of main information and extra system information. In an embodiment of the invention, the main system information comprises PLMN ID information and S-criteria information of, and the extra system information comprises the neighbor-cell-list information (NCL) of cells which has been found previously. For 4G radio access technology, the main system information can be Mater Information Block (MIB) and SystemInformationBlockType1 (SIB1), and the extra system information may be SystemInformationBlockType5 (SIB5) for LTE NCL (4G), SystemInformationBlockType6 (SIB6) for WCDMA NCL (3G), SystemInformationBlockType7 (SIB7) for GSM NCL (2G), and/or SystemInformationBlockType8 (SIB 8) for CDMA 2000 NCL, wherein the SIB5 also can be regarded as the same radio access technology (RAT) Neighbor Cell List (NCL) (RAT NCL) for 4G radio access technology. For 3G radio access technology, the extra system information may be SIB19 for 4G NCL, SIB11 for 3G and 2G NCL, and/or SIB11 bis for 3G and 2G NCL, wherein the SIB11 and SIB11 bis also can be regarded as the same RAT NCL for 3G radio access technology. For 2G radio access technology, the extra system information may be S12Quater for 4G and 3G NCL, SI2 for 2G, SI2bis for 2G NCL, and/or SI2ter for 2G NCL, wherein the SI2, SI2bis and SI2ter also can be regarded as the same RAT-NCL for 2G radio access technology. The same RAT NCL refers to NCL contains neighbor cells that RAT is same as the target radio access technology. For example, if the target radio access technology is 4G radio access technology, the SIB5 is regarded as the same RAT NCL. The different RAT NCL refers to NCL contains neighbor cells that the RAT is different from the target radio access technology. For example, if the target radio access technology is 4G radio access technology, the SIB6/7/8 is regarded as the different RAT NCL.

Figure 3A:
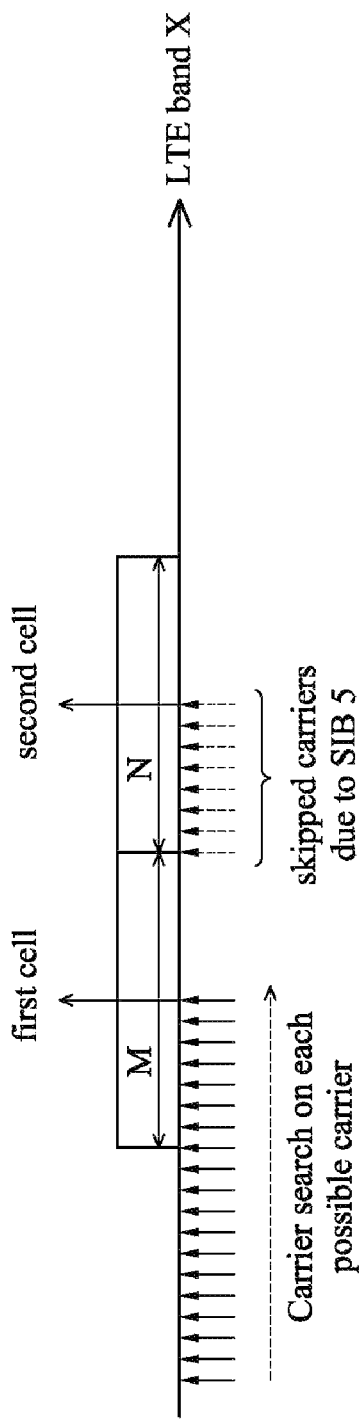
FIG. 3A is schematic diagram of carrier search of the UE 110 for an intra-band case according to an embodiment of the invention.

FIG. 3A is schematic diagram of a carrier search of the UE 110 for an intra-band case according to an embodiment of the invention. In the embodiment, the first cell and second cell corresponds to the same target radio access technology in the band X and a bandwidth corresponding to the target radio access technology is not fixed, i.e. the bandwidth of the first cell=N, and the bandwidth of the second cell=M. That is to say, the target radio access technology in FIG. 3A is 4G radio access technology, and the first cell and second cell both are 4G cells (LTE/LTE-A cells).

As shown in FIG. 3A, when the first center frequency of the first cell has been detected, the processor 113 will check whether the extra system information corresponding to the second cell has been broadcasted by the detected network. In the embodiment, the extra system information is SIB5. If the SIB5 corresponding to the second cell is broadcasted by the detected network, the processor 113 will know the second center frequency of the second cell, and search the second cell according to the SIB5 broadcast by the first cell. In addition, after obtaining the SIB5 corresponding to the second cell, the processor 112 can skip a first part of carriers of the second cell according to the SIB5 corresponding to the second cell, when searching for a third cell (if available). In the embodiment, because the target radio access technology is 4G radio access technology, the processor 113 also needs to obtain the main system information (i.e. MIB) of the second cell to know the bandwidth of the second cell. Therefore, the RF signal processing device 112 may receive the main system information of the second cell. After the processor 113 has obtained the main system information (i.e. MIB) of the second cell, the processor 113 can also skip the second part of carriers used by the second cell, when searching for the third cell. The carrier search time can be reduced because the first part and second part carrier can be skipped.

Figure 3B:
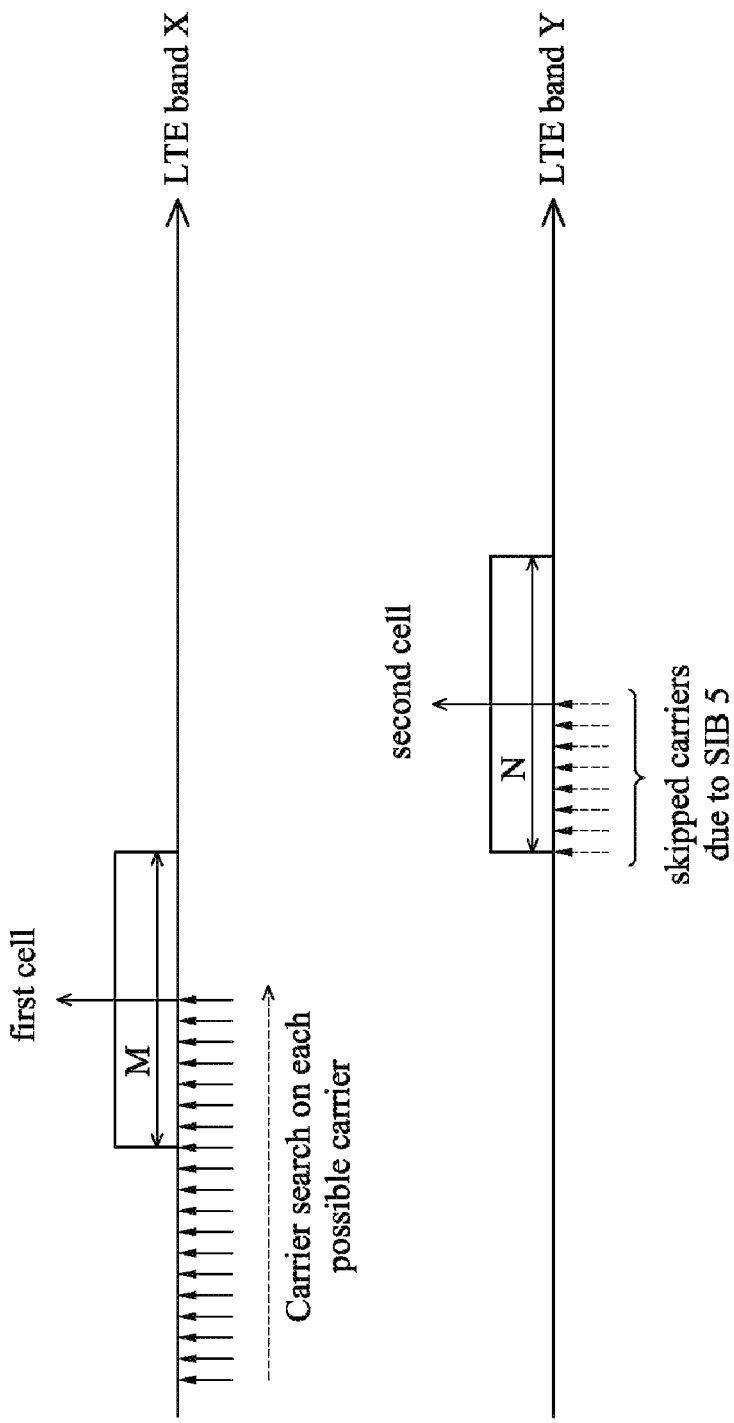
FIG. 3B is schematic diagram of carrier search of the UE 110 for an inter-band case according to an embodiment of the invention.

FIG. 3B is schematic diagram of carrier search of the UE 110 for inter-band case according to an embodiment of the invention. In the embodiment, the first cell is in the band X and second cell is in the band Y. The first cell and the second cell correspond to the same target radio access technology and bandwidth corresponding to the target radio access technology is not fixed, i.e. the bandwidth of the first cell=N, and the bandwidth of the second cell=M. That is to say, the target radio access technology in FIG. 3B is 4G radio access technology, and the first cell and second cell both are 4G cells (LTE/LTE-A cells).

As shown in FIG. 3B, when the first center frequency of the first cell has been detected in the band X, the processor 113 will check whether the extra system information corresponding to the second cell has been broadcasted by the detected network. In the embodiment, the extra system information is SIB5. If the SIB5 corresponding to the second cell is broadcasted by the detected network, the processor 113 will know the second center frequency of the second cell, and the second cell is in the band Y. Then, the processor 113 searches the second cell according to the SIB5 broadcast by the first cell. In addition, after obtaining the SIB5 corresponding to the second cell, the processor 112 can skip a first part of carriers of the second cell according to the SIB5 corresponding to the second cell, when searching for the third cell. In the embodiment, because the target radio access technology is 4G radio access technology, the processor 113 also need to obtain the main system information (i.e. MIB) of the second cell to know the bandwidth of the second cell. Therefore, the RF signal processing device 112 may receive the main system information of the second cell. After the processor 113 obtained the main system information (i.e. MIB) of the second cell, the processor 113 also can skip the second part of carriers used by the second cell, when searching for the third cell. The carrier search time can be reduced because the first part and second part carrier can be skipped.

FIG. 4A is schematic diagram of carrier search of the UE 110 for intra-band case according to another embodiment of the invention. In the embodiment, the first cell and second cell respectively correspond to the target radio access technology and the second radio access technology in the band X. The bandwidth corresponding to the target radio access technology is not fixed and the bandwidth corresponding to the second radio access technology is fixed. That is to say, the target radio access technology is 4G radio access technology, and the second radio access technology is 2G or 3G radio access technology. The first cell is a 4G cell and the second cell is a 2G or 3G cell.

As shown in FIG. 4A, when the first center frequency of the first cell has been searched, the processor 113 will check whether the extra system information corresponding to the second cell is broadcasted by the detected network. In the embodiment, the extra system information is SIB6, SIB7, and/or SIB8. If the SIB6, SIB7, and/or SIB8 corresponding to the second cell is broadcasted by the detected network, the processor 113 will know the second center frequency of the second cell, and search the second cell according to the SIB6, SIB7, and/or SIB8. In addition, after obtaining the SIB6, SIB7, and/or SIB8 corresponding to the second cell, because the bandwidth of 2G and 3G is fixed, the processor 112 doesn't need to obtain the extra bandwidth information of the second cell. Therefore, the processor 112 can skip all carriers used by the second cell according to the SIB6, SIB7, and/or SIB8 corresponding to the second cell, when searching for the third cell.

Figure 4B:
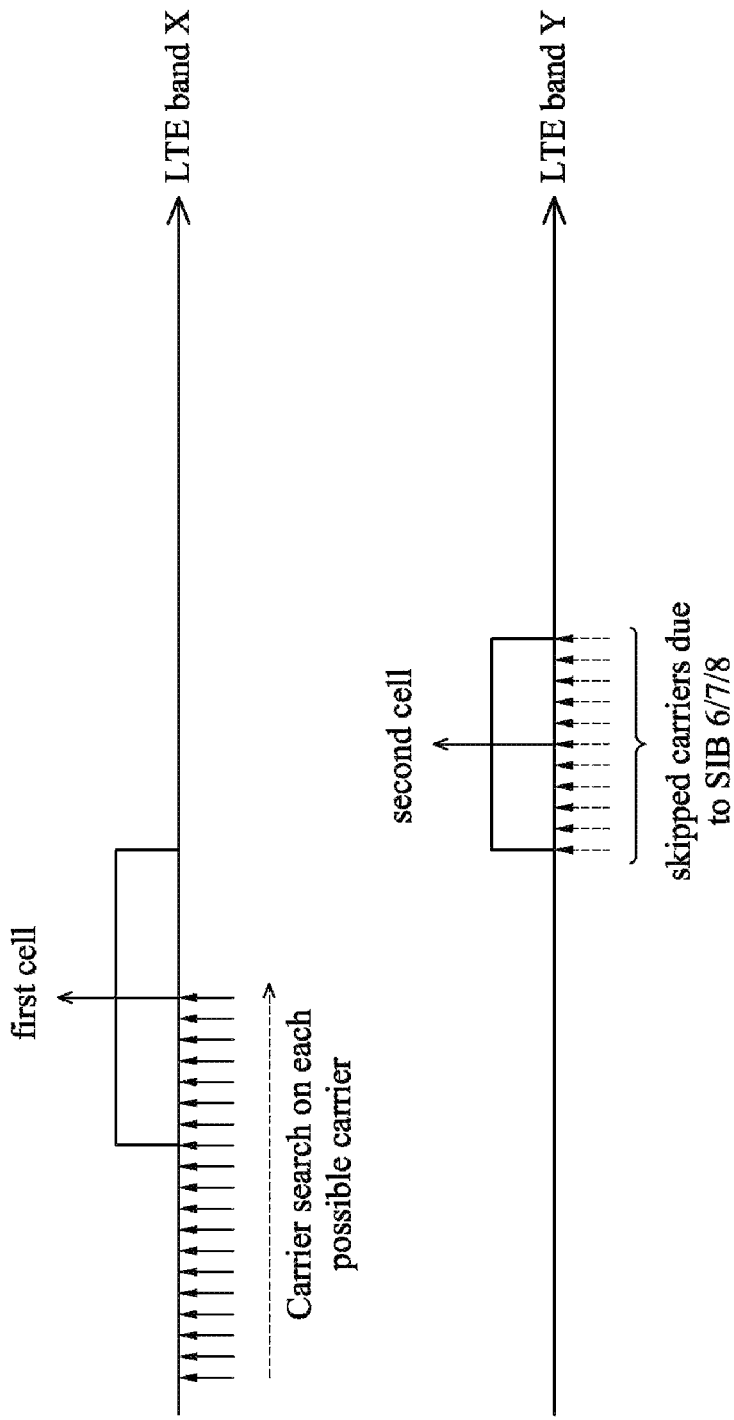
FIG. 4B is schematic diagram of carrier search of the UE 110 for an inter-band case according to another embodiment of the invention.

FIG. 4B is schematic diagram of carrier search of the UE 110 for inter-band case according to another embodiment of the invention. In the embodiment, the first cell is in a band X and the second cell is in the band Y. The first cell and second cell respectively correspond to the target radio access technology and the second radio access technology. The bandwidth corresponding to the target radio access technology is not fixed and the bandwidth corresponding to the second radio access technology is fixed. That is to say, the target radio access technology is 4G radio access technology, and the second radio access technology is 2G or 3G radio access technology. The first cell is a 4G cell and the second cell is a 2G or 3G cell.

As shown in FIG. 4B, when the first center frequency of the first cell has been searched, the processor 113 will check whether the extra system information corresponding to the second cell has been broadcasted by the detected network. In the embodiment, the extra system information is SIB6, SIB7, and/or SIB8. If the SIB6, SIB7, and/or SIB8 corresponding to the second cell is broadcasted by the detected network, the processor 113 will know the second center frequency of the second cell and the second cell is in the band Y. Then the processor 113 searches the second cell according to the SIB6, SIB7, and/or SIB8. In addition, after obtaining the SIB6, SIB7, and/or SIB8 corresponding to the second cell, because the bandwidth of 2G and 3G is fixed, the processor 112 doesn't need to obtain the extra bandwidth information of the second cell. Therefore, the processor 112 can skip all carriers used by the second cell according to the SIB6, SIB7, and/or SIB8 corresponding to the second cell, when searching for the third cell.

Note, the FIGS. 3A-3B and 4A-4B all use the 4G radio access technology as the target radio access technology as an example, but it should be understood that the invention is not limited thereto. The target radio access technology also may be 2G radio access technology or 3G radio access technology. In addition, in the FIGS. 3A-3B and 4A-4B, there are one or two cells in a band, but it is to be understood that the invention is not limited thereto. In the embodiments of the invention, there may be more than two cells in a band. In addition, in the FIGS. 3A-3B and 4A-4B, it supposes that memory device 114 has not stored system information when the processor 112 performs carrier search for the first cell. Therefore, when the processor 112 performs carrier search for the first cell, the processor 112 need to detect each cells (normal search), but it should be understood that the invention is not limited thereto.

In an embodiment of the invention, the extra system information of the second cell is stored in the memory device 114 for subsequent carrier search for all radio access technologies. Namely, when the UE 110 performs subsequent carrier search, the UE 110 may perform the carrier search according to all of the extra system information stored in the memory device 114 and obtain related system information from all of the extra system information stored in the memory device 114. The processor 113 may search for other cells corresponding to the target radio access technology or the second radio access technology according to the extra system information previously stored in the memory device 114. For example, when the processor 113 performs a carrier search for 2G or 3G radio access technology, the processor 113 may perform the carrier search according to the extra system information for 4G radio access technology which was previously stored in the memory device 114, and obtain the bandwidth information from the results of the previous carrier search for 4G radio access technology.

In an embodiment of the invention, the processor 113 determines and adjusts band search order according to the extra system information stored in the memory device 114. The processor 113 may perform inter-band received signal strength indicator (RSSI) scan first, and arrange the bands from the band with strongest RSSI to the band with smallest RSSI. Then, the processor 113 may adjust the band search order according to the extra system information stored in the memory device 114. For, example, if the band search order for RSSI is band 1, band 3, band 5, band 7, when the target radio access technology is 4G radio access technology and the processor 113 knows that band 3 and band 7 only have 2G and/or 3G cell according to the extra system information stored in the memory device 114, the processor 113 may adjust the band search order to band 1, band 5, band 3, band 7. That is to say, the processor 113 may adjust the priority of the bands which have 4G to a higher priority. Therefore, when performing a carrier search, the processor 113 may dynamically adjust the band search order according to the previous stored extra system information to increase the speed of carrier search.

Figure 5A:
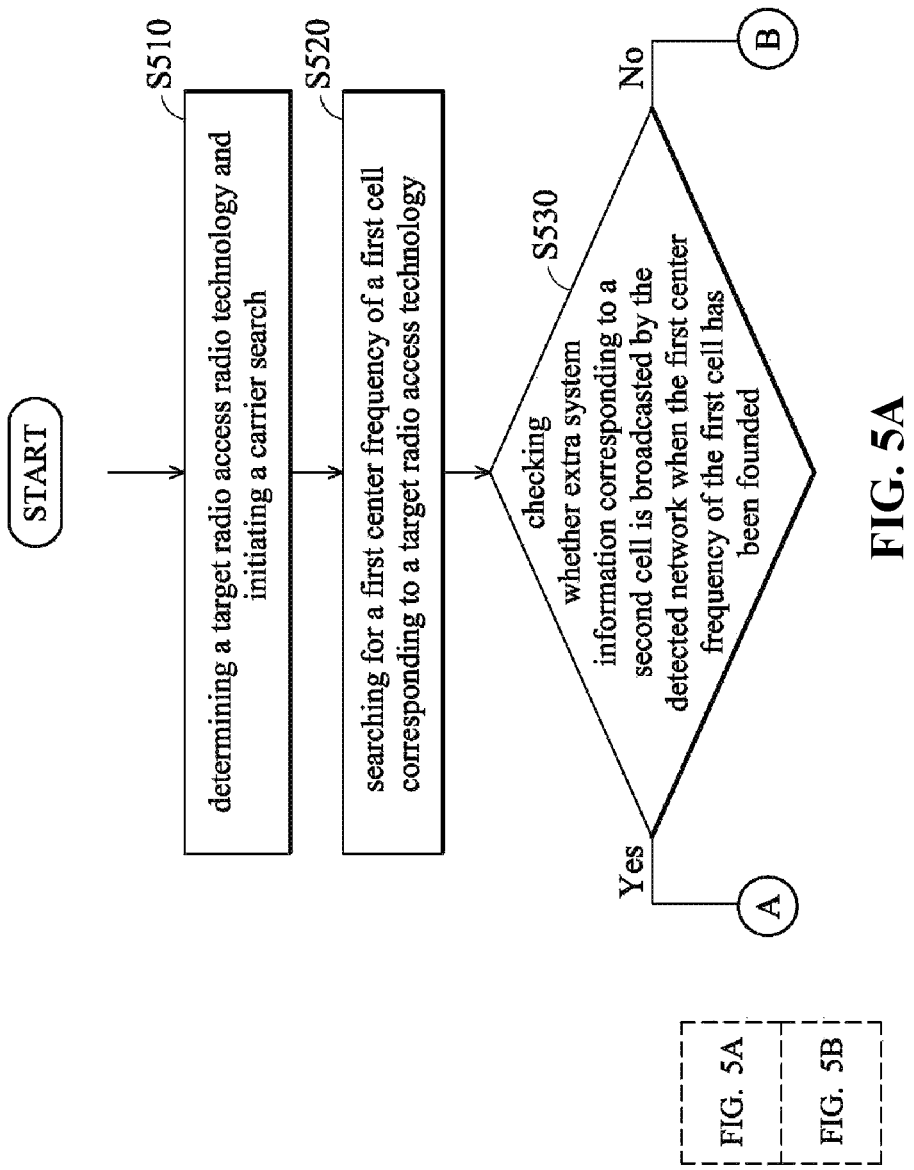
FIGS. 5A-5B is a flow chart illustrating the carrier search method according to an embodiment of the invention.
Figure 5B:
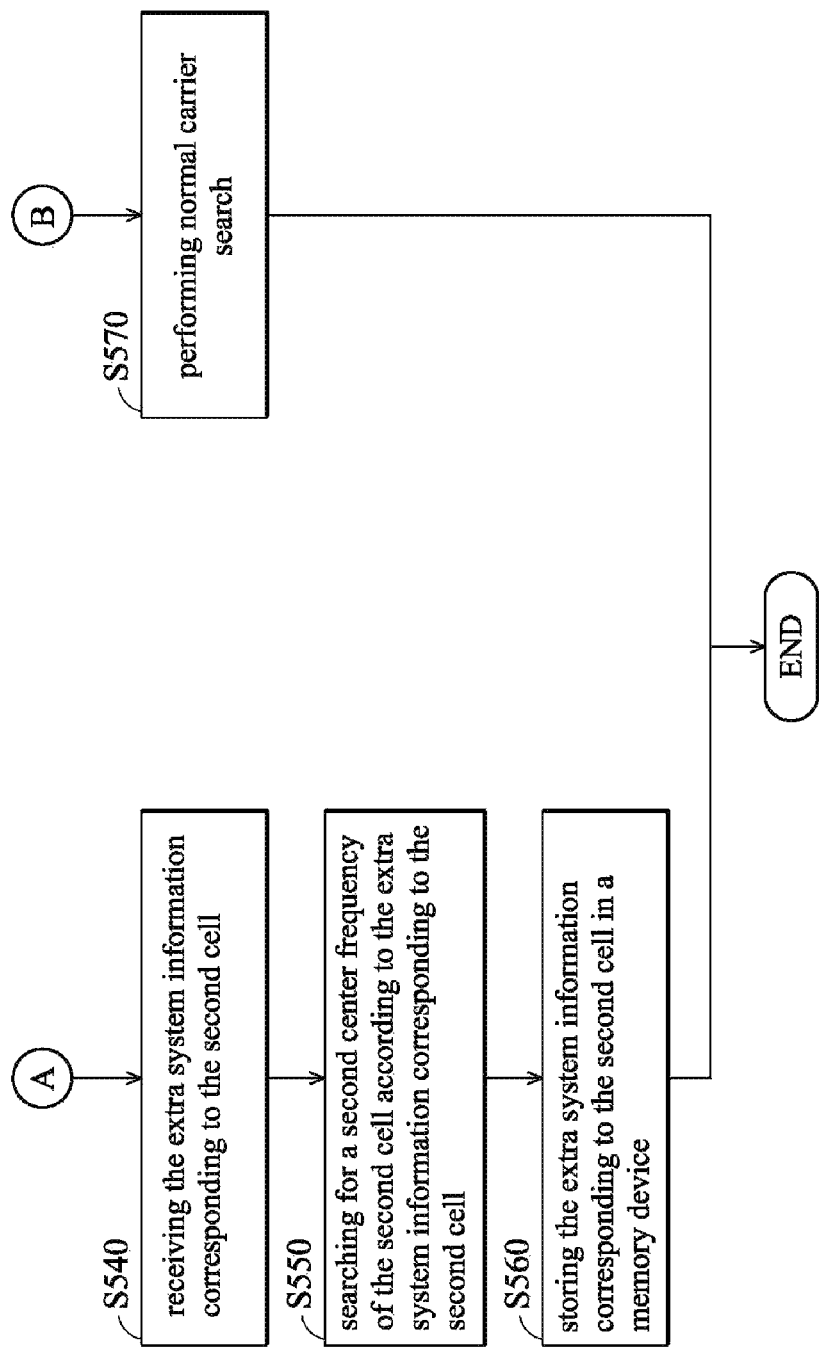

FIG. 5A-5B is a flow chart illustrating the carrier search method according to an embodiment of the invention. The carrier search is applied to the communications system 100. In step S510, a target radio access radio technology is determined and a carrier search is initiated by the user equipment 110. In step S520, a first center frequency of a first cell corresponding to a target radio access technology is searched for by the user equipment 110. In the step S530, the user equipment 110 checks whether extra system information corresponding to a second cell has been broadcasted by the detected network when the first center frequency of the first cell has been founded.

In step S540, the extra system information corresponding to the second cell is received in the first cell if the extra system information corresponding to the second cell has been broadcasted by the detected network. In step S550, a second center frequency of the second cell is searched by the user equipment 110 according to the extra system information corresponding to the second cell. In step S560, the extra system information corresponding to the second cell is stored in a memory device.

In step S570, normal carrier search is performed by the user equipment 110, if the extra system information corresponding to the second cell has not been broadcasted by the detected network. The normal carrier search is referred to search each carrier until searching for the second cell.

In an embodiment of the invention, if the previous stored extra system information is existed, the method further comprises the step of adjusting band search order and/or skipping some carriers of target radio access network based on previous stored extra information.

In an embodiment of the invention, the method further comprises that main system information of the first cell or the second cell is received by the user equipment 110 to obtain bandwidth information of the first cell or the second cell.

Figure 6A:
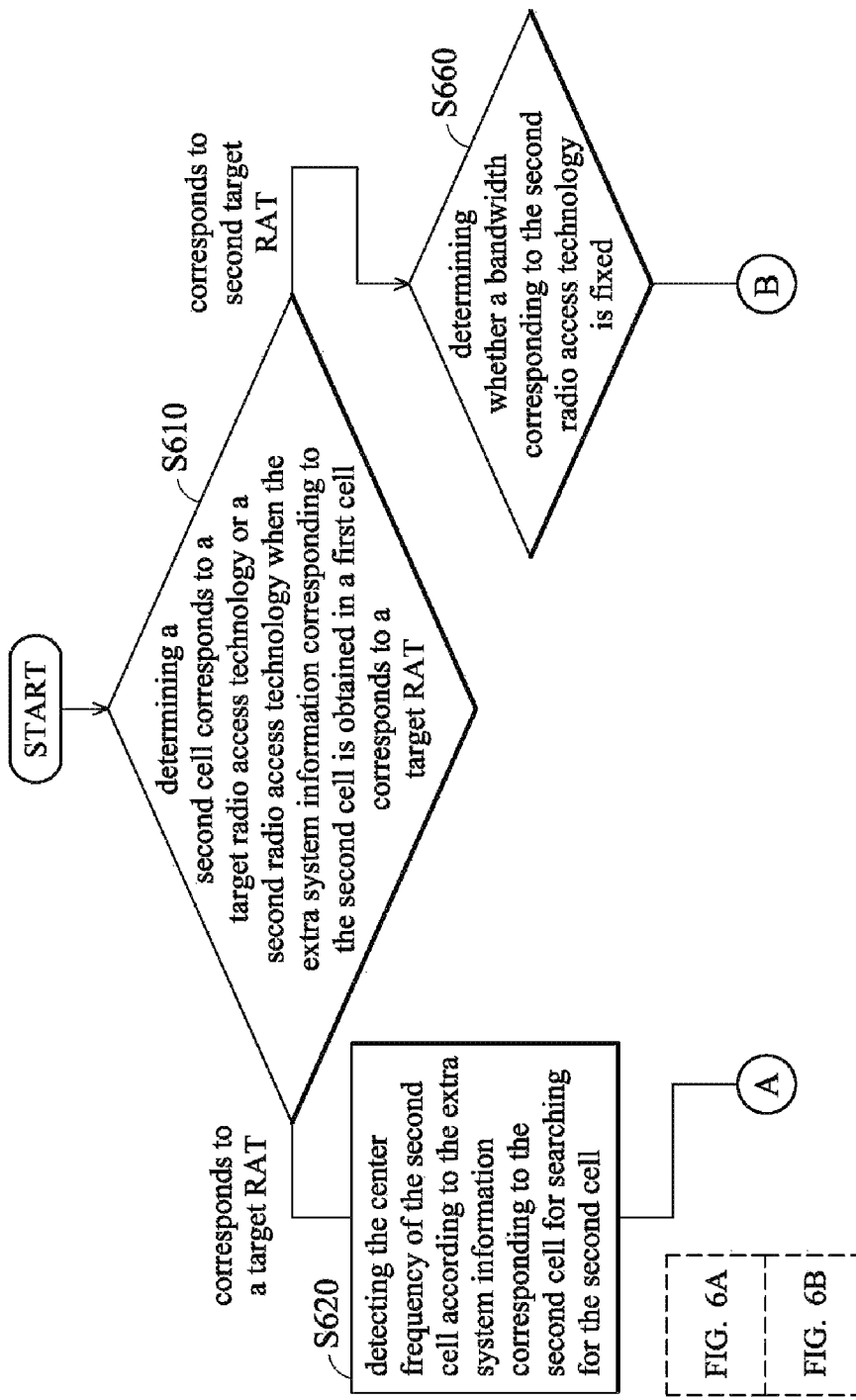
FIGS. 6A-6B is a flow chart illustrating the carrier search method for an intra-band case according to another embodiment of the invention.
Figure 6B:
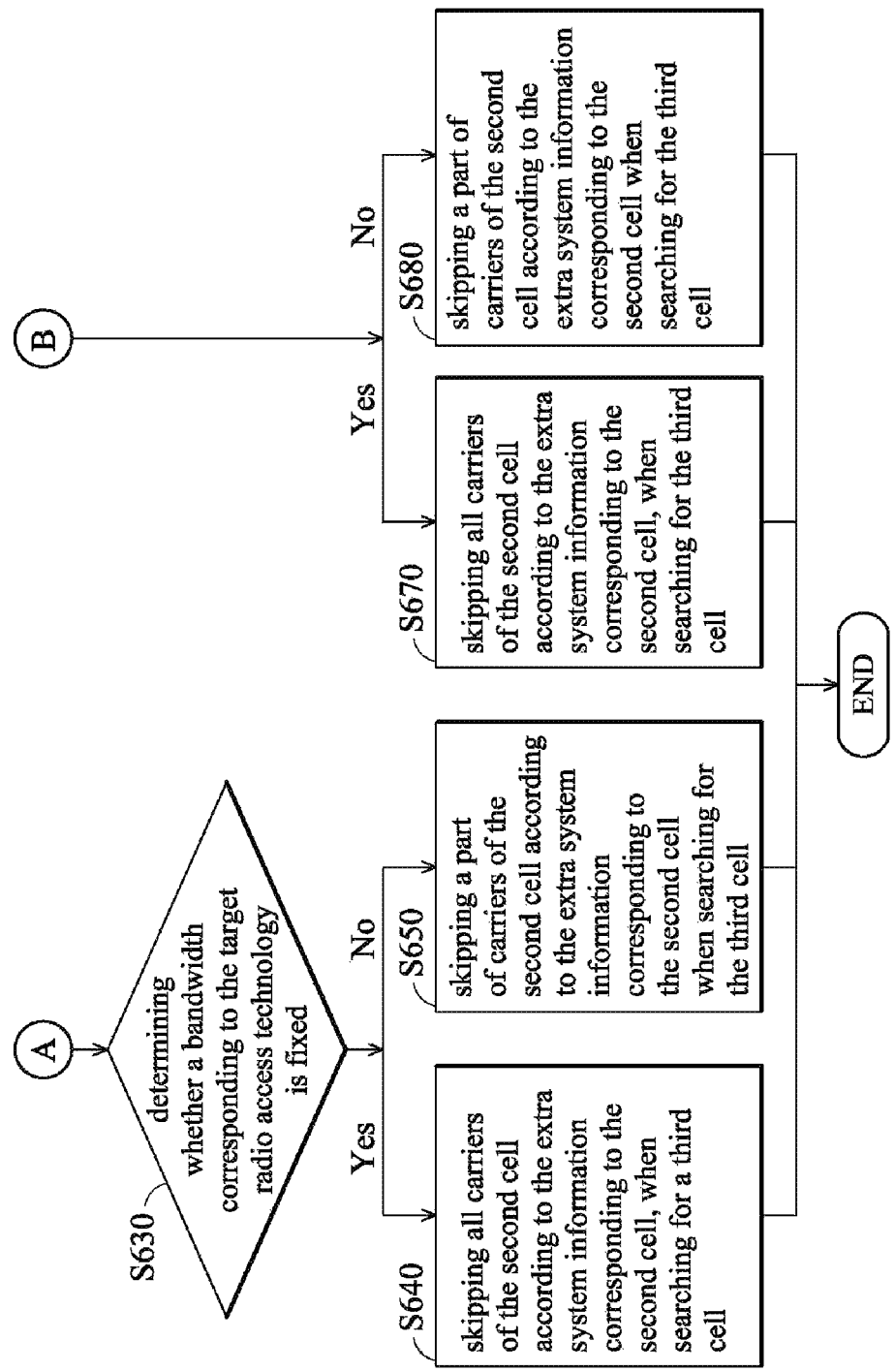

FIG. 6A-6B is a flow chart illustrating the carrier search method for intra-band case according to another embodiment of the invention. The carrier search method is applied to the communications system 100. In step S610, when the extra system information corresponding to a second cell is obtained in a first cell, the user equipment 110 determines the second cell corresponds to a target radio access technology or a second radio access technology.

In step S620, if the second cell corresponds to the target radio access technology, the center frequency of the second cell is searched for according to the extra system information corresponding to the second cell by the user equipment 110 for searching for the second cell. In step S630, the user equipment 110 determines whether a bandwidth corresponding to the target radio access technology is fixed. In step S640, if the bandwidth corresponding to the target radio access technology is fixed, all carriers used by the second cell are skipped by the user equipment 110 according to the extra system information corresponding to the second cell, when searching for the third cell. In step S650, if the bandwidth corresponding to the target radio access technology is not fixed, a part of carriers used by the second cell is skipped by the user equipment 110 according to the extra system information corresponding to the second cell when searching for the third cell.

In step S660, if the second cell corresponds to the second radio access technology, the user equipment 110 further determines a bandwidth corresponding to the second radio access technology is fixed. In step S670, if the bandwidth corresponding to the second radio access technology is fixed, all carriers used by the second cell are skipped by the user equipment 110 according to the extra system information corresponding to the second cell, when searching for the third cell. In step S680, if the bandwidth corresponding to the second radio access technology is not fixed, a part of carriers of the second cell is skipped by the user equipment 110 according to the extra system information corresponding to the second cell when searching for the third cell.

In an embodiment of the invention, a part of carriers are regarded as the carriers of the minimal cell bandwidth if no stored main information. In another embodiment of the invention, a part of carriers of the second cell is skipped according to the previous stored main information.

Figure 7A:
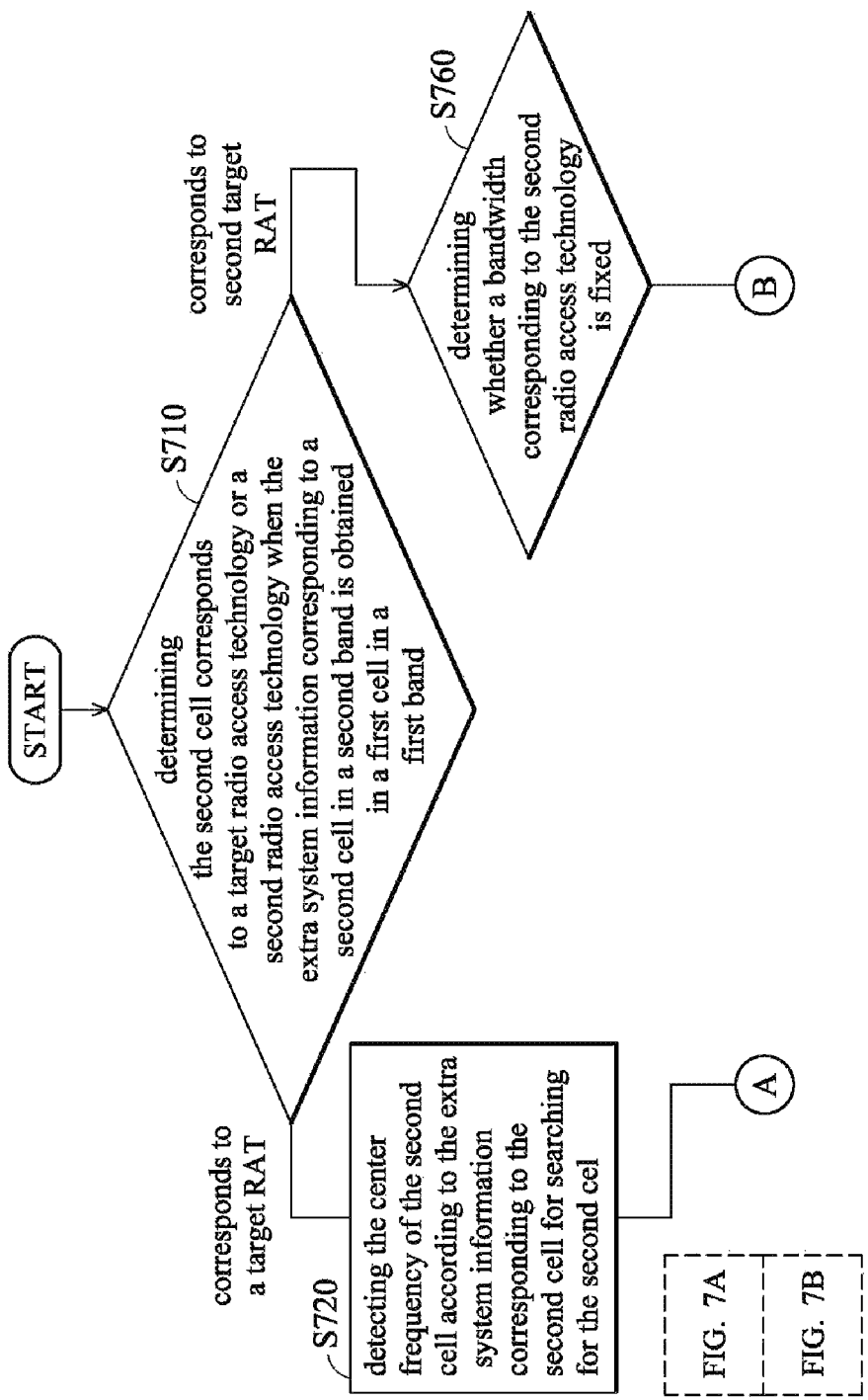
FIGS. 7A-7B is a flow chart illustrating the carrier search method for an inter-band case according to another embodiment of the invention.
Figure 7B:
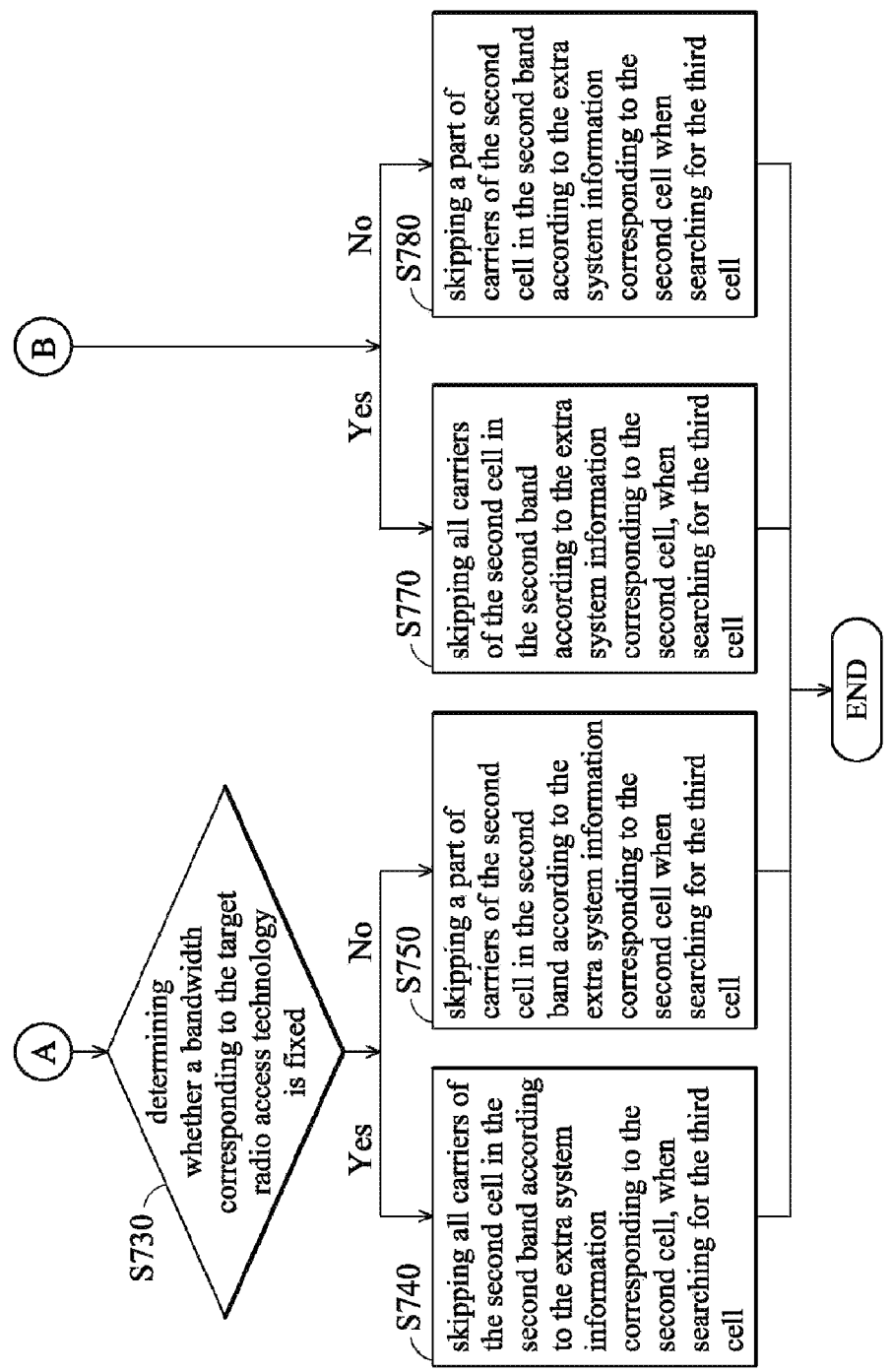

FIG. 7A-7B is a flow chart illustrating the carrier search method for inter-band case according to another embodiment of the invention. The carrier search method is applied to the communications system 100. In step S710, when the extra system information corresponding to a second cell in a second band is obtained in a first cell in a first band, the user equipment 110 determines the second cell corresponds to a target radio access technology or a second radio access technology.

In step S720, if the second cell in the second band corresponds to the target radio access technology, the center frequency of the second cell is detected according to the extra system information corresponding to the second cell by the user equipment 110 for searching for the second cell. In step S730, the user equipment 110 determines whether the bandwidth corresponding to the target radio access technology is fixed. In step S740, if the bandwidth corresponding to the target radio access technology is fixed, all carriers used by the second cell in the second band are skipped by the user equipment 110 according to the extra system information corresponding to the third cell, when searching for the third cell. In step S750, if the bandwidth corresponding to the target radio access technology is not fixed, a part of carriers used by the second cell in the second band is skipped by the user equipment 110 according to the extra system information corresponding to the second cell when searching for the third cell.

In step S760, if the second cell corresponds to the second radio access technology, the user equipment 110 further determines whether a bandwidth corresponding to the second radio access technology is fixed. In step S770, if the bandwidth corresponding to the second radio access technology is fixed, all carriers used by the second cell in the second band are skipped by the user equipment 110 according to the extra system information corresponding to the second cell, when searching for the third cell. In step S780, if the bandwidth corresponding to the second radio access technology is not fixed, a part of carriers of the second cell in the second band is skipped by the user equipment 110 according to the extra system information corresponding to the second cell when searching for the third cell. In an embodiment of the invention, a part of carriers are regarded as the carriers of the minimal cell bandwidth if no stored main information. In another embodiment of the invention, a part of carriers of the second cell is skipped according to the previous stored main information.

In an embodiment of the invention, when the next carrier search is performed by the user equipment 110 or a carrier search for second radio access technology is performed by the user equipment 110, the methods further comprise the step of searching cells corresponding to a target radio access technology or a second radio access technology according to the extra system information which is previously stored the memory device. In an embodiment of the invention, the methods further comprise the step of determining and adjusting a band search order according to the extra system information which was previously stored the memory device.

Note, in the FIGS. 6A-7B, the method further comprise the step of determining whether the second cell is detected in the center frequency of the second cell after step S620 and S720. If the second cell is detected in the center frequency of the second cell, steps S630 and 730 are performed. If the second cell is not detected in the center frequency of the second cell, normal carrier search is performed.

In addition, in the FIGS. 5A-7B, it supposes that there is not previous stored system information when performing carrier search for the first cell, but it should be understood that the invention is not limited thereto. If the previous stored system information has existed, the first also cell can be detected according to the previous stored system information during performing carrier search for the first cell.

Therefore, the carrier search method of the invention may speed up the carrier search because the extra system information which was previously stored in the memory device. For the carrier search method of the invention, when the user equipment perform carrier search, the user equipment doesn't need to search all bands and all possible carriers in the bands. The user equipment can skip some carriers when performing carrier search, and dynamically adjust the band search order according to the extra system information received from the any detected networks which is previously stored the memory device.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

Reference throughout this specification to "one embodiment" or "an embodiment" means that a particular feature, structure, or characteristic described in connection with the embodiment is included in at least one embodiment of the invention, but does not denote that they are present in every embodiment. Thus, the appearance of the phrases "in one embodiment" or "in an embodiment" in various places throughout this specification are not necessarily referring to the same embodiment of the invention.

The above paragraphs describe many aspects of the invention. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

The invention claimed is:

1. A communication apparatus, comprising:
an RF signal processing device, configured to receive a plurality of main system information and extra system information broadcasted by service networks;
a processor, configured to check whether the extra system information corresponding to a second cell has been broadcasted by a detected network when a first center frequency of a first cell corresponding to a target radio access technology has been searched, and search a second center frequency of the second cell according to the extra system information corresponding to the second cell; and
a memory device, configured to store the main and extra system information received from detected service networks,
wherein the extra system information includes at least one of SystemInformationBlockType5 (SIB5), SIB6, SIB7 and SIB8,
wherein during a next carrier search, the processor skips some carriers of the target radio access technology according to the main and extra system information stored in the memory device.

2. The communication apparatus of claim 1, wherein the first cell and the second cell are in the same band or in different bands.

3. The communication apparatus of claim 2, wherein if the first cell and second cell correspond to the target radio access technology and a bandwidth corresponding to the target radio access technology is not fixed, the processor skips a part of carriers of the second cell according to the extra system information corresponding to the second cell, when searching for a third cell.

4. The communication apparatus of claim 3, the processor skips another part of carriers of the second cell according to the main system information corresponding to the second cell.

5. The communication apparatus of claim 3, wherein if the first cell and second cell respectively correspond to the target radio access technology and a second radio access technology and a bandwidth corresponding to the second radio access technology is fixed, the processor skips all carriers of the second cell according to the extra system information corresponding to the second cell, when searching for the third cell.

6. The communication apparatus of claim 2, wherein if the first cell and second cell correspond to the target radio access technology and a bandwidth corresponding to the target radio access technology is fixed, the processor skips all carriers of the second cell according to the extra system information, when searching for a third cell.

7. The communication apparatus of claim 6, wherein if the first cell and second cell respectively corresponds to the target radio access technology and a second radio access technology, and a bandwidth corresponding to the second radio access technology is not fixed, the processor skips a part of carriers of the second cell according to the extra system information corresponding to the second cell, when searching for the third cell.

8. The communication apparatus of claim 1, wherein the processor receives the main system information of the first cell or the second cell to obtain bandwidth information of the first cell or the second cell.

9. The communication apparatus of claim 1, wherein each of the main system information comprises PLMN ID information and S-criteria information, and the extra system information comprises the neighbor-cell-list information.

10. The communication apparatus of claim 1, wherein during a next carrier search, the processor searches cells corresponding to the target radio access technology or a second radio access technology according to the main system information and extra system information of the memory device.

11. The communication apparatus of claim 1, wherein the processor determines and adjusts a band search order according to the extra system information of the memory device.

12. A carrier search method, for a communication apparatus, comprising:
 determining a target radio access technology and initiating a carrier search;
 searching for a first center frequency of a first cell corresponding to a target radio access technology;
 checking whether extra system information corresponding to a second cell has been broadcasted by the detected network when the first center frequency of the first cell has been found;
 receiving the extra system information corresponding to the second cell if the extra system information corresponding to the second cell is broadcasted by the detected network;
 searching for a second center frequency of the second cell according to the extra system information corresponding to the second cell, if the extra system information corresponding to the second cell is broadcasted by the detected network;
 storing the extra system information corresponding to the second cell to a memory device; and
 skipping some carriers of the target radio access technology according to the main and extra system information stored in the memory device during a next carrier search,
 wherein the extra system information includes at least one of SystemInformationBlockType5 (SIB5), SIB6, SIB7 and SIB8.

13. The carrier search method of claim 12, wherein the first cell and the second cell are in the same band or in different bands.

14. The carrier search method of claim 13, further comprising:
 skipping a part of carriers of the second cell according to the extra system information corresponding to the second cell when searching for a third cell, if the first cell and second cell corresponds to the target radio access technology and a bandwidth corresponding to the target radio access technology is not fixed.

15. The carrier search method of claim 14, further comprising:
 skipping another part of carriers of the second cell according to the main system information corresponding to the second cell.

16. The carrier search method of claim 14, further comprising:
 skipping all carriers of the second cell according to the extra system information corresponding to the second cell, when searching for the third cell, if the first cell and second cell respectively correspond to the target radio access technology and a second radio access technology, and a bandwidth corresponding to the second radio access technology is fixed.

17. The carrier search method of claim 13, further comprising:
 skipping all carriers of the second cell according to the extra system information when searching for a third cell, if the first cell and second cell corresponds to the target radio access technology and a bandwidth corresponding to the target radio access technology is fixed.

18. The carrier search method of claim 17, further comprising:
 skipping a part of or all carriers of the second cell according to the extra system information corresponding to the second cell when searching for the third cell, if the first cell and second cell respectively corresponds to the target radio access technology and a second radio access technology and a bandwidth corresponding to the second radio access technology is not fixed.

19. The carrier search method of claim 12, further comprising:
 receiving main system information of the first cell or the second cell to obtain bandwidth information of the first cell or the second cell.

20. The carrier search method of claim 12, wherein each of main system information comprises PLMN ID information and S-criteria information, and the extra system information comprises the neighbor-cell-list information.

21. The carrier search method of claim 12, further comprising:
 searching for other cells corresponding to a target radio access technology or a second radio access technology according to the main system information and extra system information of the memory device, during a next carrier search.

22. The carrier search method of claim 12, further comprising:
 determining and adjusting a band search order according to the extra system information of the memory device.

* * * * *